(12) United States Patent
Miyamoto

(10) Patent No.: US 8,008,387 B2
(45) Date of Patent: Aug. 30, 2011

(54) LASER-WELDABLE RESIN COMPOSITION AND MOLDED PRODUCT

(75) Inventor: Yasumitsu Miyamoto, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 16 days.

(21) Appl. No.: 11/953,938

(22) Filed: Dec. 11, 2007

(65) Prior Publication Data

US 2008/0153957 A1    Jun. 26, 2008

(30) Foreign Application Priority Data

Dec. 22, 2006  (JP) ................................ 2006-345225

(51) Int. Cl.
*C08K 5/103* (2006.01)
*C08K 5/098* (2006.01)
*B29C 65/16* (2006.01)
*B32B 37/04* (2006.01)

(52) U.S. Cl. ..... 524/284; 524/384; 524/386; 156/272.8; 428/411.1

(58) Field of Classification Search .................. 524/284, 524/394, 386; 156/272.8
See application file for complete search history.

(56) References Cited

U.S. PATENT DOCUMENTS

| | | | |
|---|---|---|---|
| 4,565,850 A * | 1/1986 | Prevorsek et al. ............ | 525/425 |
| 5,006,637 A | 4/1991 | Guggenheim et al. | |
| 5,756,644 A | 5/1998 | Hodge et al. | |
| 2002/0134771 A1 * | 9/2002 | Wenger et al. ........... | 219/121.69 |
| 2003/0125429 A1 * | 7/2003 | Joachimi et al. .............. | 524/105 |
| 2005/0119377 A1 * | 6/2005 | Ishii et al. ........................ | 524/88 |
| 2005/0154099 A1 * | 7/2005 | Kobayashi et al. ............. | 524/99 |
| 2005/0167025 A1 * | 8/2005 | Kobayashi et al. ............. | 156/64 |
| 2005/0171321 A1 * | 8/2005 | Sumi ............................ | 528/176 |
| 2005/0256275 A1 * | 11/2005 | Kobayashi et al. ........... | 525/349 |
| 2007/0129475 A1 * | 6/2007 | Sakata et al. ................... | 524/306 |
| 2007/0173630 A1 * | 7/2007 | Bahr et al. ..................... | 528/272 |
| 2009/0130451 A1 * | 5/2009 | Farrell ....................... | 428/411.1 |

FOREIGN PATENT DOCUMENTS

| | | |
|---|---|---|
| JP | 5-170993 | 7/1993 |
| JP | 6-184410 | 7/1994 |
| JP | 2000-290476 | 10/2000 |
| JP | 2001-026656 | 1/2001 |
| JP | 2003-292752 | 10/2003 |

OTHER PUBLICATIONS

Polymer Handbook, John Wiley & Sons, Inc., pp. IV/54 and IV/56-57 (1999).

* cited by examiner

*Primary Examiner* — Tae H Yoon
(74) *Attorney, Agent, or Firm* — Nixon & Vanderhye P.C.

(57) ABSTRACT

A laser-weldable polybutylene terephthalate-series resin composition having a high laser weldability is provided. The resin composition comprises (A) a polybutylene terephthalate-series resin and (B) a fatty acid-series compound (e.g., a $C_{12-36}$ fatty acid ester, and a metal salt of a $C_{12-36}$ fatty acid), and if necessary (C) a cyclic polyester oligomer (e.g., a cyclic polyalkylene terephthalate oligomer). In the resin composition, the proportion of the fatty acid-series compound (B) may be usually about 0.01 to 1.0 part by weight relative to 100 parts by weight of the polybutylene terephthalate-series resin (A).

5 Claims, 1 Drawing Sheet

LASER-WELDABLE RESIN COMPOSITION AND MOLDED PRODUCT

FIELD OF THE INVENTION

The present invention relates to a polybutylene terephthalate-series resin composition excellent in laser weldability (or laser transmissivity), a molded product formed from the composition (a molded product located in a transmitting side for a laser beam), a composite molded product using the molded product, and a process for producing the composite molded product. Hereinafter, a polybutylene terephthalate-series resin is sometimes referred to as a PBT-series resin.

BACKGROUND OF THE INVENTION

A polybutylene terephthalate (PBT) resin has excellent mechanical and electrical properties, heat resistance, weather resistance, water resistance, and resistance to chemicals and solvents. Therefore, the resin is widely used as an engineering plastic in various purposes such as automotive parts and electric or electronic device parts. In recent years, the use of the PBT resin as an exterior package or a container material (a housing material) for protecting a substrate of an electronic device part or others has increased. When it is necessary to seal the package or the container in such a case, bonding or welding methods are usually conducted. Among the welding methods, a laser welding method enables bonding (or joining) by melting only an area to be welded without vibrating or heating all over a product, differently from a vibration welding or an ultrasonic welding. Therefore, in recent years, the laser welding method has been attracting much attention as a method suitable for bonding of an exterior package (or a container) for protecting a precision electronic device part, or others.

However, since the polybutylene terephthalate resin is a material having a relatively low laser transmissivity, a molded product formed from the resin is limited in thickness for applying a laser welding to the molded product. In order to respond to requests, for example, to allow a laser welding of a thick product, the molded product of the polybutylene terephthalate resin has required an improved laser transmissivity.

For example, Japanese Patent Application Laid-Open No. 26656/2001 (JP-2001-26656A, Claims and paragraph numbers [0003] and [0020]) discloses a process for producing a united molded product, which comprises uniting (A) a molded product formed from (a) at least one polyester-series copolymer with (B) other molded product by a welding processing. In the process, the polyester-series copolymer (a) is selected from the group consisting of a polybutylene terephthalate-series copolymer having a melting point within a specific range, a polyethylene terephthalate-series copolymer having a melting point within a specific range, and a polyethylene naphthalate-series copolymer having a melting point within a specific range. This document mentions that a PBT-series copolymer having a melting point within the range of 170° C. to 220° C. has a low heat of fusion and can melt by using a lower fusion energy, particularly due to a high light transmittance in a laser welding method, and that the bonding using a lower fusion energy improves the welding strength and increases the range of welding conditions. In addition, this document describes that a homopolybutylene terephthalate resin has a small laser-welding strength. However, in the case of the copolymer, although the transmissivity is improved to some degree, there is a possibility of deterioration in moldability.

Moreover, Japanese Patent Application Laid-Open No. 292752/2003 (JP-2003-292752A, Claims and paragraph number [0029]) discloses a laser-weldable resin composition which comprises (A) a polybutylene terephthalate or a polybutylene terephthalate-series resin comprising a polybutylene terephthalate and a polybutylene terephthalate copolymer and (B) at least one resin selected from the group consisting of a polycarbonate resin, an acrylonitrile-styrene copolymer, a polyphenylene oxide, a styrene resin, an acryl resin, a polyether sulfone, a polyarylate, and a polyethylene terephthalate resin. In the composition, the proportion of the resin (B) is 1 to 50% by weight relative to the total amount of the resins (A) and (B). Moreover, this document mentions that the resin composition may contain, as a mold-release agent, a montan wax, a metal soap (such as lithium stearate or aluminum stearate), a higher fatty acid amide (such as ethylenebisstearylamide), a polycondensate of ethylenediamine, stearic acid, and sebacic acid, and others. In the resin composition described in this document, when the mixing ratio of the resin (B) is small, the effects of the resin (B) are unclear. A large mixing ratio of the resin (B) sometimes ensures improvement in the laser transmissivity of the composition, while there is a possibility that the properties as the PBT are lost (e.g., the chemical resistance or the moldability is deteriorated).

Incidentally, Japanese Patent Application Laid-Open No. 290476/2000 (JP-2000-290476A, Claims and paragraph number [0022]) discloses a weldable resin composition which comprises 100 parts by weight of a thermoplastic polyester (such as a polybutylene terephthalate) and 0.02 to 50 parts by weight of at least one compound selected from the group consisting of a hydrocarbon-series compound, an alkylenebis (fatty acid amide)-series compound, a fatty acid ester-series compound (e.g., a partly saponified ester of montanic acid) a fatty acid and a metal salt thereof, a glycol-series compound, a polyester elastomer-series compound, a polyamide elastomer-series compound, a polyolefinic compound, and an epoxy-series compound. Although this document mentions that the resin composition or a molded product thereof can be utilized for a welding such as an ultrasonic welding, a vibration welding, a spin welding, a high-frequency welding, an induction welding, a hot plate welding, a hot-air welding, a friction welding, or an impulse welding, an application of the resin composition to a laser welding is not supposed.

Moreover, Japanese Patent Application Laid-Open No. 184410/1994 (JP-6-184410A, Claims) discloses a polybutylene terephthalate resin composition comprising (A) a polybutylene terephthalate resin having a terminal carboxyl group of not more than 15 equivalent/$10^6$ g and (B) 0.01 to 3% by weight of a fatty acid ester-series compound (e.g., an ester of a fatty acid having a carbon number of 12 to 32 with a mono- or polyvalent alcohol) for imparting improved feeding in screw and mold release property to the resin (A). Further, Japanese Patent Application Laid-Open No. 170933/1993 (JP-5-170933A, Claims) discloses that an organic additive that can show internal lubrication and/or mold release effects (e.g., a metal salt of a fatty acid) may be added to a thin polyester molded product molded from a specific polybutylene terephthalate copolymer. In these documents, both the fatty acid ester-series compound and the metal salt of the fatty acid are used as a lubricant. These documents are silent on the laser welding of the resin composition or the thin molded product.

SUMMARY OF THE INVENTION

It is therefore an object of the present invention to provide a laser-weldable (or laser-welding) polybutylene terephthalate-series resin composition having an improved laser transmissivity even in the use of a polybutylene terephthalate-series resin (particularly a homopolybutylene terephthalate) as a base resin, a laser-transmittable resin molded product formed from the resin composition, a composite molded product comprising the molded product, and a process for producing the composite molded product.

It is another object of the present invention to provide a laser-weldable polybutylene terephthalate-series resin composition which ensures a high laser-weldability without deterioration in properties of a polybutylene terephthalate-series resin (e.g., mechanical strength and moldability or formability), a laser-transmittable resin molded product formed from the resin composition, a composite molded product comprising the molded product, and a process for producing the composite molded product.

The inventor of the present invention made intensive studies to achieve the above objects and finally found that a combination use of a polybutylene terephthalate-series resin (particularly a homopolybutylene terephthalate) and a fatty acid-series compound (and further a cyclic polyester oligomer) imparts laser transmissivity (or laser weldability) to a composition comprising these components and ensures compatibility between the properties of the polybutylene terephthalate-series resin (e.g., mechanical strength and moldability or formability) and the laser transmissivity (or laser weldability). The present invention was accomplished based on the above findings.

That is, the laser-weldable polybutylene terephthalate-series resin composition (or the polybutylene terephthalate-series resin composition for a laser welding) of the present invention comprises (A) a polybutylene terephthalate (PBT)-series resin and (B) a fatty acid-series compound (at least one member selected from the group consisting of a fatty acid and a derivative thereof). In the resin composition, the proportion of the fatty acid-series compound (B) may be usually about 0.01 to 1.0 part by weight relative to 100 parts by weight of the polybutylene terephthalate-series resin (A).

In the resin composition of the present invention, the polybutylene terephthalate-series resin (A) may be a PBT-series resin having a low degree of modification. Moreover, the resin composition of the present invention may substantially comprise the polybutylene terephthalate-series resin (A) alone as the resin component. According to the present invention, even when the PBT-series resin having a low degree of modification is used or is used without other resin, the laser transmissivity of the resin composition can be improved.

The fatty acid-series compound (B) may comprise, for example, at least one member selected from the group consisting of a fatty acid ester (e.g., a $C_{12-36}$ fatty acid ester) and a metal salt of a fatty acid (e.g., a metal salt of a $C_{12-36}$ fatty acid).

The resin composition of the present invention may further comprise (C) a cyclic polyester oligomer (for example, a cyclic polyalkylene terephthalate oligomer such as a cyclic poly$C_{2-4}$alkylene terephthalate oligomer). The proportion of the cyclic polyester oligomer (C) may be, for example, about 0.01 to 20 parts by weight relative to 100 parts by weight of the polybutylene terephthalate-series resin (A).

Incidentally, the resin composition of the present invention may be a resin composition containing no (or substantially no) filler.

The present invention also includes a laser-transmittable (or laser-transmitting) resin molded product (or a molded product located in a transmitting side for a laser beam) formed from the resin composition. More specifically, the present invention includes a laser transmittable resin molded product that is able to be brought into contact with a laser-absorbable (or laser-absorbing) resin molded product and is bondable to the laser-absorbable resin molded product by a laser beam transmitting the laser-transmittable molded product, and that is formed from the resin composition. Moreover, the present invention includes a composite molded product comprising the laser-transmittable resin molded product and a laser-absorbable resin molded product, in which these molded products are bonded together by a laser welding. The composite molded product may be produced by, for example, irradiating a laser beam on a contact surface of a laser-transmittable resin molded product and a laser-absorbable resin molded product.

DETAILED DESCRIPTION OF THE INVENTION

Figure 1:
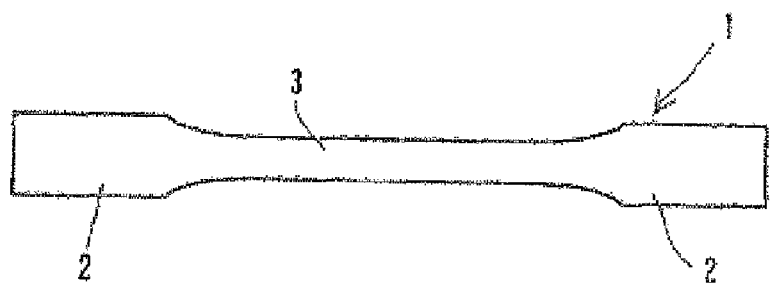
FIG. 1 is a plan view of a plate dumbbell test piece used in Examples.

[Polybutylene Terephthalate-Series Resin Composition]
(A) Polybutylene Terephthalate-Series Resin The polybutylene terephthalate-series resin (A) is a thermoplastic resin obtainable from at least a terephthalic acid component (terephthalic acid or a derivative thereof capable of forming an ester (or an ester-formable derivative thereof)) and an alkylene glycol having 4 carbon atoms (1,4-butanediol) or a derivative thereof capable of forming an ester (or an ester-formable derivative thereof) as polymerization components.

Such a polybutylene terephthalate-series resin (PBT-series resin) as a base resin may include a homopolyester (or a polybutylene terephthalate) or a copolyester (or a butylene terephthalate-series copolymer or a polybutylene terephthalate copolyester) containing a butylene terephthalate unit as a main unit [for example, in a proportion of not less than 50% by weight (e.g., about 55 to 100% by weight), preferably not less than 60% by weight (e.g., about 65 to 100% by weight), and more preferably not less than 70% by weight (e.g., about 75 to 100% by weight)] and others.

In the copolyester (butylene terephthalate-series copolymer or modified PBT resin), a copolymerizable monomer (or a comonomer) may include a dicarboxylic acid component (dibasic acid) excluding the terephthalic acid component; a diol component excluding 1,4-butanediol; a hydroxycarboxylic acid component; a lactone component; and others. The copolymerizable monomers may be used singly or in combination.

The dicarboxylic acid (or dicarboxylic acid component or dicarboxylic acid compound) may include, for example, an aliphatic dicarboxylic acid (e.g., a $C_{4-40}$dicarboxylic acid such as succinic acid, glutaric acid, adipic acid, pimelic acid, suberic acid, azelaic acid, sebacic acid, undecanedicarboxylic acid, dodecanedicarboxylic acid, hexadecanedicarboxylic acid, or dimer acid, preferably a $C_{4-14}$dicarboxylic acid), an alicyclic dicarboxylic acid (e.g., a $C_{8-12}$dicarboxylic acid such as hexahydrophthalic acid, hexahydroisophthalic acid, hexahydroterephthalic acid, or himic acid), an aromatic dicarboxylic acid other than terephthalic acid [e.g., an aromatic $C_{8-16}$dicarboxylic acid such as phthalic acid, isophthalic acid; a naphthalenedicarboxylic acid (such as 2,6-naphthalenedicarboxylic acid); 4,4'-diphenyldicarboxylic acid, 4,4'-diphenyletherdicarboxylic acid, 4,4'-diphenylmethanedicarboxylic acid, or 4,4'-diphenylketonedicarboxylic acid], or a reactive derivative thereof [e.g., a derivative capable of forming an ester, such as a lower alkyl ester (e.g., a $C_{1-4}$alkyl ester of phthalic acid or isophthalic acid, such as dimethyl phthalate or dimethylisophthalate (DMI)), an acid chloride; an acid anhydride; or an alkyl-, alkoxy-, or halogen-substituted compound of the dicarboxylic acid]. Further, if necessary, the dicarboxylic acid component may be used in combination with a polycarboxylic acid (such as trimesic acid, trimellitic acid or pyromellitic acid) or an ester-formable derivative thereof (e.g., an alcohol ester). The combination use of such a polyfunctional compound allows a branched PBT-series resin.

The diol (or diol component or diol compound) may include, for example, an aliphatic diol other than 1,4-butanediol [for example, an alkanediol (e.g., a lower alkanediol such as ethylene glycol, trimethylene glycol, propylene glycol, neopentyl glycol, hexanediol (e.g., 1,6-hexanediol), octanediol (e.g., 1,3-octanediol, 1,8-octanediol), or decanediol, preferably a straight chain or branched chain $C_{2-12}$alkanediol, and more preferably a straight chain or branched chain $C_{2-10}$alkanediol), a (poly)oxyalkylene glycol (e.g., a glycol having a plurality of oxy$C_{2-4}$alkylene units, for example, diethylene glycol, dipropylene glycol, ditetramethylene glycol, triethylene glycol, tripropylene glycol, and a polytetramethylene glycol)], an alicyclic diol (e.g., 1,4-cyclohexanediol, 1,4-cyclohexanedimethanol, and hydrogenated bisphenol A), an aromatic diol [e.g., a dihydroxy$C_{6-14}$arene such as hydroquinone, resorcinol, or naphthalenediol; a biphenol (e.g., 4,4'-dihydroxybiphenyl); a bisphenol compound; and xylylene glycol], and a reactive derivative thereof (e.g., a derivative capable of forming an ester, such as an alkyl-, alkoxy-, or halogen-substituted compound of the diol). Further, if necessary, the diol may be used in combination with a polyol such as glycerin, trimethylolpropane, trimethylolethane, or pentaerythritol, or an ester-formable derivative thereof. The combination use of such a polyfunctional compound allows a branched PBT-series resin.

The bisphenol compound may include a bis(hydroxyaryl)$C_{1-6}$alkane such as bis(4-hydroxyphenyl)methane (bisphenol F), 1,1-bis(4-hydroxyphenyl)ethane (bisphenol AD), 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, or 2,2-bis(4-hydroxyphenyl)-4-methylpentane; a bis(hydroxyaryl)$C_{4-10}$cycloalkane such as 1,1-bis(4-hydroxyphenyl)cyclopentane or 1,1-bis(4-hydroxyphenyl)cyclohexane; 4,4'-dihydroxydiphenyl ether; 4,4'-dihydroxydiphenyl sulfone; 4,4'-dihydroxydiphenyl sulfide; 4,4'-dihydroxydiphenyl ketone, and an adduct thereof with an alkylene oxide. The adduct with an alkylene oxide may include an adduct of a bisphenol compound (e.g., bisphenol A, bisphenol AD, and bisphenol F) with a $C_{2-3}$alkylene oxide, e.g., 2,2-bis-[4-(2-hydroxyethoxy)phenyl]propane, diethoxylated bisphenol A (EBPA), 2,2-bis-[4-(2-hydroxypropoxy)phenyl]propane, dipropoxylated bisphenol A, an adduct of bisphenol A with 3 mol of propylene oxide, and others. In the adduct with an alkylene oxide, the mole number of the added alkylene oxide (a $C_{2-3}$alkylene oxide such as ethylene oxide or propylene oxide) is about 1 to 10 mol, and preferably about 1 to 5 mol relative to 1 mol of each hydroxyl group.

The hydroxycarboxylic acid (or hydroxycarboxylic acid component or hydroxycarboxylic acid compound) may include, for example, a hydroxycarboxylic acid such as hydroxybenzoic acid, hydroxynaphthoic acid, hydroxyphenylacetic acid, 4-carboxy-4-hydroxybiphenyl, glycolic acid, or hydroxycaproic acid, or a derivative thereof (e.g., an alkyl-, alkoxy-, or halogen-substituted compound). Exemplified as the lactone may be a $C_{3-12}$lactone such as propiolactone, butyrolactone, valerolactone, or caprolactone (e.g., ε-caprolactone), and others.

Examples of the preferred copolymerizable monomer may include a diol compound [e.g., a $C_{2-6}$alkylene glycol (e.g., a straight chain or branched chain alkylene glycol such as ethylene glycol, trimethylene glycol, propylene glycol or hexanediol), a polyoxy$C_{2-4}$alkylene glycol which has a repeating oxyalkylene unit of about 2 to 4 (e.g., diethylene glycol), a bisphenol compound (e.g., a bisphenol compound, or an alkylene oxide adduct thereof), and 1,4-cyclohexanedimethanol], and a dicarboxylic acid compound [e.g., a $C_{6-12}$ aliphatic dicarboxylic acid (such as adipic acid, pimelic acid, suberic acid, azelaic acid, or sebacic acid), and an asymmetrical aromatic dicarboxylic acid having two carboxyl groups at asymmetrical positions of an arene ring thereof]. Among these compounds, the preferred one includes an aromatic compound, e.g., the alkylene oxide adduct of a bisphenol compound (particularly bisphenol A), and an asymmetrical aromatic dicarboxylic acid [e.g., phthalic acid, isophthalic acid, and a reactive derivative thereof (e.g., a lower alkyl ester such as dimethyl isophthalate (DMI)].

As the polybutylene terephthalate-series resin, the preferred one includes the homopolyester (the polybutylene terephthalate) and/or the copolymer (the polybutylene terephthalate copolyester). In the polybutylene terephthalate-series resin, the proportion of the copolymerizable monomer (the proportion modified with the copolymerizable monomer) may be usually not more than 45 mol % (e.g., about 0 to 40 mol %) and preferably not more than 35 mol % (e.g., about 0 to 35 mol %). More preferably, the polybutylene terephthalate-series resin may be a homo- or copolyester having the copolymerizable monomer of not more than 30 mol % (e.g., about 0 to 30 mol %). Even when the resin component comprises a PBT-series resin having such a low degree of modification (particularly a homopolyester), the resin composition of the present invention can be efficiently improved in the laser transmissivity. Therefore, the resin composition can be used for a laser welding (as a laser-transmitting member) without deterioration in excellent properties of the PBT resin (e.g., chemical resistance and moldability).

Incidentally, in the copolymer, the proportion of the copolymerizable monomer may be, for example, selected from the range of about 0.01 to 30 mol % and may be usually about 1 to 30 mol %, preferably about 3 to 25 mol %, and more preferably about 5 to 20 mol % (e.g., about 5 to 15 mol %), Moreover, in the combination use of the homopolyester (the polybutylene terephthalate) and the copolymer (the copolyester), the proportion of the homopolyester relative to the copolyester is within such a range that the proportion of the copolymerizable monomer is about 0.1 to 30 mol % (preferably about 1 to 25 mol %, and more preferably about 5 to 25 mol %) relative to the whole monomer (the total amount of the monomer constituting the homopolyester and the monomer constituting the copolyester). The proportion of the homopolyester relative to the copolyester [the former/the latter] may be usually selected from the range of about 99/1 to 1/99 (weight ratio), preferably about 95/5 to 5/95 (weight ratio), and more preferably about 90/10 to 10/90 (weight ratio).

Incidentally, the intrinsic viscosity (IV) of the PBT-series resin may be, for example, not less than 0.6 dL/g, preferably about 0.64 to 1.3 dL/g, and more preferably about 0.65 to 1.2 dL/g. The use of the PBT-series resin having an intrinsic viscosity within such a range tends to ensure both impartment of sufficient toughness and decrease of melt viscosity efficiently. Incidentally, for example, the intrinsic viscosity (IV) may be measured in o-chlorophenol at a temperature of 35° C. In the case of an exceedingly small intrinsic viscosity, there is a possibility that enough mechanical properties cannot be obtained. On the other hand, in the case of an exceedingly large intrinsic viscosity, there is a possibility that the flowability is insufficient in a molding process of the resin composition.

Incidentally, the PBT-series resin to be used may be either a commercially available product or a product obtained by copolymerizing (polycondensing) terephthalic acid or a reactive derivative thereof and 1,4-butanediol and if necessary, a copolymerizable monomer, with a conventional manner, for example, transesterification, direct esterification, and others.

(B) Fatty Acid-Series Compound

The present invention is characterized by an addition of a fatty acid-series compound (in a specific proportion) in the above-mentioned PBT-series resin composition. The laser transmissivity of the PBT-series resin composition can be efficiently improved by the addition of the fatty acid-series compound.

The fatty acid-series compound (B) may include a fatty acid, a fatty acid derivative, and others Examples of the fatty acid may include a long chain fatty acid (or a higher fatty acid, for example, a $C_{10-40}$ fatty acid such as capric acid, lauric acid, myristic acid, pentadecylic acid, palmitic acid, stearic acid, arachidic acid, behenic acid, carnaubic acid, cerotic acid, heptacosanoic acid, montanic acid, oleic acid, linoleic acid, linolenic acid, arachidonic acid, erucic acid, sebacic acid, dodecanedioic acid, or tetradecanedioic acid (particular a monocarboxylic acid), a preferably a $C_{12-36}$ fatty acid, and more preferably a $C_{18-32}$ fatty acid). The fatty acid may be either a saturated fatty acid or an unsaturated fatty acid. In particular, the fatty acid may be a saturated fatty acid.

The fatty acid derivative may include a fatty acid ester, a fatty acid amide, a metal salt of a fatty acid, and others.

The fatty acid ester is an ester of a fatty acid (the above-mentioned fatty acid) with an alcohol. The alcohol may include a monovalent alcohol (or a monool, for example, an alkanol such as methanol, ethanol, propanol, butanol, hexanol, octanol, decanol, lauryl alcohol, or stearyl alcohol, preferably a $C_{1-30}$alkanol, and more preferably a $C_{1-20}$alkanol), a polyvalent alcohol [for example, a diol (e.g., an alkanediol such as ethylene glycol, trimethylene glycol, propylene glycol, 1,3-butanediol, 1,4-butanediol, 1,6-hexanediol, or neo-pentyl glycol, preferably a $C_{2-10}$alkanediol, and more preferably a $C_{2-6}$alkanediol; and a poly$C_{2-4}$alkylene glycol such as diethylene glycol or dipropylene glycol), a polyol having 3 or more hydroxyl groups (for example, a $C_{3-12}$ aliphatic polyol such as glycerin, trimethylolethane, trimethylolpropane, pentaerythritol, or sorbitan, and preferably a $C_{4-10}$ aliphatic polyol], and others. Incidentally, when the fatty acid is a fatty acid having a plurality of carboxyl groups (e.g., a saturated or unsaturated dicarboxylic acid), the fatty acid ester may be either a monoester or a polyester (e.g., a diester). The fatty acid ester may be an ester with such an alcohol alone or with two or more alcohols.

The representative fatty acid esters includes an ester of the above-mentioned fatty acid, for example, a higher fatty acid ester {for example, a montanic acid ester [or a montan wax, e.g., an ester of montanic acid with a monovalent alcohol, such as an alkyl ester of montanic acid (e.g., a $C_{1-30}$alkyl ester such as a methyl ester, a propyl ester, a lauryl ester, or a stearyl ester); an ester of montanic acid with an alkanediol, such as a (poly)alkylene glycol montanate (e.g., a mono- or dimontanate of a (poly)$C_{2-4}$alkylene glycol such as ethylene glycol, propylene glycol, butanediol, or a polyethylene glycol)); and an ester of montanic acid with an aliphatic polyol, such as an ester of montanic acid with glycerin (e.g., a mono- to triester such as glycerin monomontanate), an ester of montanic acid with trimethylolpropane (e.g., a mono- to triester such as trimethylolpropane monomontanate), an ester of montanic acid with pentaerythritol (e.g., a mono- to tetraester such as pentaerythritol monomontanate), an ester of montanic acid with sorbitan (e.g., a mono- to triester such as sorbitan monomontanate or sorbitan dimontanate)], esters corresponding to these montanic acid esters (e.g., a lauric acid ester, a palmitic acid ester, a stearic acid ester (e.g., glycerin mono- to tristearate, pentaerythritol mono- to tetrastearate, and sorbitan mono- to tristearate), a behenic acid ester (e.g., sorbitan monobehenate), and an oleic acid ester)}.

The fatty acid amide may include an amide of the above-mentioned fatty acid, for example, a higher fatty acid amide [e.g., a $C_{10-40}$ saturated or unsaturated fatty acid amide (e.g., a mono- or diamide) such as lauramide, myristamide, palmitamide, stearamide, arachidamide, behenamide, oleamide, stearylstearamide, stearyloleamide, an amide of ethylenediamine with distearic acid, an amide of hexamethylenediamine with distearic acid, an amide of ethylenediamine with dioleic acid, an amide of ethylenediamine with dierucic acid, or a diamide of ethylenediamine with stearic acid and oleic acid], and others.

The metal salt of the fatty acid may include, for example, an alkali metal salt (e.g., a sodium salt and a potassium salt), an alkaline earth metal salt (e.g., a magnesium salt and a calcium salt), a salt of a metal of the group 2B of the Periodic Table of Elements (e.g., a zinc salt), and a salt of a metal of the group 3B of the Periodic Table of Elements (e.g., an aluminum salt). As the metal constituting the metal salt of the fatty acid, the above-mentioned metal may be used singly or in combination.

These fatty acid-series compounds may be used singly or in combination.

The preferred fatty acid-series compound may include a fatty acid ester {for example, a $C_{12-36}$ fatty acid ester (particularly, an aliphatic monocarboxylic acid ester, e.g., an ester with an alkanol (e.g., a $C_{1-30}$alcohol), an ester with an alkanediol (e.g., a $C_{2-10}$alkanediol), an ester with a polyalkanediol (e.g., a poly$C_{2-4}$alkanediol such as a polyethylene glycol), and an ester with a polyol having 3 or more hydroxyl groups such as a $C_{3-12}$ aliphatic polyol (e.g., glycerin and sorbitan) (e.g., a mono- to tetraester))}, and a metal salt of a fatty acid [e.g., an alkali metal salt of a $C_{12-36}$ fatty acid (e.g., a sodium salt) and an alkaline earth metal salt of a $C_{12-36}$ fatty acid (e.g., a calcium salt)].

The proportion of the fatty acid-series compound (B) relative to 100 parts by weight of the polybutylene terephthalate-series resin (A) may be selected from the range of 0.01 to 1.0 part by weight. For example, the proportion is about 0.02 to 0.7 part by weight, preferably about 0.03 to 0.5 part by weight, and more preferably about 0.04 to 0.4 part by weight. In the present invention, the addition of the fatty acid-series compound to the resin composition in a specific low proportion as described the above efficiently ensures improvement of the laser transmissivity. Incidentally, in the case of an exceedingly low proportion of the fatty acid-series compound, enough improvement of the laser transmissivity cannot be obtained in some cases. On the other hand, in the case of an exceedingly high proportion of the fatty acid-series compound, there is a possibility that the laser transmissivity is deteriorated.

(C) Cyclic Polyester Oligomer

The PBT-series resin composition of the present invention may further contain a cyclic polyester oligomer. The combination of the cyclic polyester oligomer and the above-mentioned fatty acid-series compound can further improve the laser transmissivity (and the laser weldability) of the above-mentioned resin composition. Moreover, since such a cyclic polyester oligomer does not deteriorate the properties of the PBT-series resin itself (e.g., mechanical strength) even in the case of the addition to the resin composition, the resin composition can realize both improvement of the laser transmissivity and the retention of the properties such as mechanical strength. Further, since the addition of the cyclic polyester oligomer can ensure the improvement of the melt flowability of the PET-series resin, the moldability of the PET-series resin composition can be also improved. Therefore, the combination of the cyclic polyester oligomer and the fatty acid-series compound can realize well-balanced the improvement of the laser transmissivity, the retention of the properties of the PBT-series resin, and the improvement of the flowability.

The cyclic polyester oligomer (C) (cyclic polyester, cyclic ester-series oligomer) may be a cyclic polymer having a polyester backbone. The polyester backbone (or a polyester constituting a polyester backbone) may be an aromatic polyester, an alicyclic polyester, or an aliphatic polyester. The polyester backbone may be usually an aromatic polyester.

Representative examples of the cyclic polyester oligomer include a compound having a structural unit represented by the following formula (for example, a cyclic aromatic polyester oligomer).

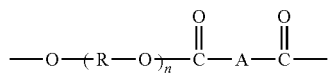

In the formula, the group R represents an alkylene group or a bivalent alicyclic group, the group A represents a bivalent aromatic group or an alicyclic group, the number n denotes an integer of not less than 1.

In the above-mentioned formula, the alkylene group R may include, for example, a $C_{2-12}$alkylene group such as ethylene group, propylene group, trimethylene group, tetramethylene group, or hexamethylene group (particularly a straight chain $C_{2-12}$alkylene group), preferably a $C_{2-8}$alkylene group, and more preferably a $C_{2-4}$alkylene group. Moreover, in the above-mentioned formula, the bivalent alicyclic group R may include a cycloalkylene group R (e.g., a $C_{5-10}$cycloalkylene group such as 1,4-cyclohexylene group), a cycloalkanedialkylene group (e.g., a $C_{5-10}$cycloalkane-di$C_{1-4}$alkylene group such as 1,4-cyclohexanedimethylene group), and others. Further, the number n may be not less than 1 and may be, for example, 1 to 10, preferably 1 to 5, more preferably 1 to 3, and particularly 1. Incidentally, the number n is not less than 2, a plurality of R may be the same or different alkylene group or cycloalkylene group.

In the above-mentioned formula, the aromatic group A may include a $C_{6-12}$arylene group such as a phenylene group (e.g., m-phenylene group and p-phenylene group) or a naphthylene group (e.g., 2,6-naphthylene group), preferably a $C_{6-10}$arylene group, more preferably a $C_{6-8}$arylene group, and others. Moreover, the alicyclic group A may include, for example, a cycloalkylene group (e.g., a $C_{5-10}$cycloalkylene group such as 1,4-cyclohexylene group).

The preferred cyclic polyester oligomer may include a cyclic polyalkylene arylate [for example, a cyclic poly$C_{2-6}$alkylene terephthalate such as a cyclic polyethylene terephthalate oligomer, a cyclic polypropylene terephthalate oligomer, or a cyclic polybutylene terephthalate (polytetramethylene terephthalate) oligomer; and a cyclic polycyclohexanedimethylene terephthalate]. In particular, a cyclic polyalkylene terephthalate oligomer (particularly, a cyclic poly$C_{2-4}$alkylene terephthalate such as a cyclic polybutylene terephthalate) is preferred.

The average degree of polymerization of the cyclic polyester oligomer (C) may be, for example, about 2 to 30, preferably about 3 to 25, more preferably about 5 to 20 (e.g., about 6 to 18), and usually about 8 to 15. In particular, the cyclic polyester oligomer may be an oligomer having a degree of polymerization up to 12 in a main part (e.g., an area showing a peak in a gel permeation chromatography) and may be a mixture of cyclic oligomers with various degrees of polymerization.

The melting point of the cyclic polyester oligomer may be, for example, about 100 to 250° C., preferably about 110 to 220° C., and more preferably about 120 to 210° C. (e.g. about 130 to 200° C.).

Incidentally, as the cyclic polyester oligomer, a product produced by a known process [for example, a process which comprises condensing a corresponding diol and a halide of a dicarboxylic acid (e.g., terephthaloyl chloride) in the presence of an amine having no steric hindrance; a process described in Japanese Patent Application Laid-Open No. 225633/1996 (JP-8-225633A) (a process which comprises contacting a bis-hydroxyalkyl-terminated diester or an oligomer thereof, a high-boiling point solvent, and an esterification catalyst); a process described in Japanese Patent Application Laid-Open No. 19962/1996 (JP-8-19962A, Japanese Patent No. 3426064B); a process described in Japanese Patent Application Laid-Open No. 507599/2004 (JP-2004-507599A); and a process described in Japanese Patent Application Laid-Open No. 317041/2002 (JP-2002-317041A)] may be used or a commercially available product may be used. For example, the cyclic polyester oligomer (cyclic polybutylene terephthalate oligomer) is available as "CBT" manufactured by Cyclics Corporation.

The proportion of the cyclic polyester oligomer (C) relative to 100 parts by weight of the polybutylene terephthalate-series resin (A) may be, for example, about 0.01 to 20 parts by weight, preferably about 0.05 to 15 parts by weight, and more preferably about 0.2 to 10 parts by weight. In the present invention, as described the above, even in the addition of a low portion of the cyclic polyester oligomer (C), the laser transmissivity of the PBT-series resin composition can be further improved.

Moreover, the proportion of the cyclic polyester oligomer (C) relative to 100 parts by weight of the fatty acid-series compound (B) may be, for example, about 0.1 to 100 parts by weight, preferably about 0.5 to 50 parts by weight, and more preferably about 1 to 30 parts by weight.

If necessary, the resin composition of the present invention may contain other resin(s) (e.g., a thermoplastic resin) and/or various additives in the range that the advantages of the present invention are not deteriorated. Other resin may include, for example, a polyester resin other than the PBT-series resin (e.g., a polyethylene terephthalate resin), a polyolefinic resin, a polystyrenic resin (e.g., a polystyrene and an acrylonitrile-styrene copolymer), a polyamide-series resin, a polycarbonate-series resin, a polyacetal, a polyarylene oxide (e.g., a polyphenylene oxide), a polyarylene sulfide, a polyether sulfone, and a polyarylate. These other resins may be used singly or in combination.

In particular, the resin composition of the present invention may be a resin composition substantially containing only a polybutylene terephthalate-series resin as a resin component. In the present invention, as the resin composition described in the above-mentioned JP-2003-292752A, even when the resin composition does not contain other resin (that is, at least one resin selected from the group consisting of a polycarbonate resin, an acrylonitrile-styrene copolymer, a polyphenylene oxide, a styrene resin, an acrylic resin, a polyether sulfone, a polyarylate, and a polyethylene terephthalate resin) in addition to the PBT-series resin, the resin composition has an excellent laser transmissivity.

Moreover, the additive may include a filler, a stabilizer (e.g., an oxidation inhibitor or an antioxidant, an ultraviolet ray absorbing agent, and a heat stabilizer), an antistatic agent, a flame retardant, a flame-retardant auxiliary (or a flame-retardant synergist), a coloring agent (e.g., a dye or a pigment), a lubricant, a plasticizer, a mold-release agent, a nucleating agent, a dripping inhibitor, and others.

The filler (or reinforcing agent) may include an inorganic filler [for example, a fibrous filler (e.g., an inorganic fiber such as a glass fiber, a milled glass fiber, a glass bead, a glass flake, a glass balloon, a silica, an alumina fiber, a zirconia fiber, a potassium titanate fiber, or a carbon fiber), and a plate-like or particulate filler (e.g., a carbon black, a graphite, a silicate such as a calcium silicate aluminum silicate, a kaolin, a talc, or a clay, a metal oxide such as iron oxide, titanium oxide, zinc oxide, antimony oxide, or alumina, a carbonate or a sulfate of a metal (such as calcium, magnesium, or zinc), silicon carbide, silicon nitride, and boron nitride)], an organic filler (e.g., an aromatic polyester fiber having a high melting point, a liquid crystalline polyester fiber, an aromatic polyamide fiber, a fluorine-containing resin fiber, and a polyamide fiber), and others. These additives may be used singly or in combination.

Incidentally, the resin composition of the present invention may be a non-reinforced (or non-reinforcing) resin composition. That is, the resin composition of the present invention may be a resin composition containing substantially no filler (and no nucleating agent). The PBT-series resin composition usually contains the filler in practical cases. However, in order to retain enough laser transmissivity, the resin composition of the present invention may be used without containing the filler. Incidentally, the addition of the filler often induces the decrease of the laser transmissivity.

The PBT-series resin composition of the present invention may be a particulate mixture or a molten mixture (e.g., a pellet). In particular, since the resin composition of the present invention is excellent in moldability, the resin composition may be efficiently obtained as a molten mixture (a melt-kneaded product) of each component [the PBT-series resin (A) and the fatty acid-series compound (B), and if necessary, the cyclic polyester oligomer (C) (and further optional other component(s))]. The molten mixture may be produced by melt-kneading each component with a conventional manner. Further, the resin composition of the present invention may be subjected in the form of a mixture (e.g., a particulate or a molten mixture) to a production of a molded product.

While the resin composition of the present invention comprises the PBT-series resin, the resin composition has a high light-transmittance (particularly a light transmittance of a laser beam) and is suitable for a laser welding. Therefore, the resin composition of the present invention is preferably suitable for a laser-weldable resin composition, specifically, a resin composition for a laser-transmittable resin molded product (a resin composition for forming a laser-transmittable resin molded product, a resin composition for a member located in a transmitting side in a laser welding). Incidentally, the laser-transmittable resin molded product (sometimes referred to as a laser-transmittable molded product, a resin molded product located in a laser-transmitting side, a molded product located in a laser-transmitting side, a laser-transmittable resin member, or a laser-transmittable member) is a molded product which is able to be brought into contact with a resin molded product absorbable of a laser beam and is bondable to the resin molded product by a laser beam, and which is formed from the above-mentioned resin composition.

[Molded Product]

The laser-transmittable resin molded product of the present invention is formed from the resin composition. Such a molded product (a laser-transmittable resin molded product) may be produced by subjecting the resin composition comprising each component [that is, the PBT-series resin (A) and the fatty acid-series compound (B) (and if necessary the cyclic polyester oligomer (C) and further if necessary other component(s))] to a conventional molding manner. For example, the molded product (or molded article) of the present invention may be produced by (1) a process comprising mixing each component, kneading and extruding the resulting mixture into pellets with a extruder (a single screw or twin screw extruder), and molding a product from the pellets, (2) a process comprising once making pellets (master batch) different in formulation, mixing (diluting) the pellets in a certain ratio, and molding a product having a certain formulation from the resulting pellets, (3) a process comprising directly feeding one or not less than two of each component in a molding machine, and others. Moreover, from the viewpoint of the homogeneous mixing of these components, it is preferred to mix part of the resin component as a fine powder with other components. Further, the above-mentioned additive can be added at any timing to give a desired composition.

The molded product may be formed by melt-kneading the PUT-series resin composition and subjecting the kneaded matter to a conventional manner such as an extrusion molding, an injection molding, a compression molding, a blow molding, a vacuum molding, a rotational molding, an insert molding, or a gas injection molding. In particular, the molded product may be a molded product obtained by an injection molding (an injection-molded product).

The shape (or configuration) of the molded product is not particularly limited to a specific one. Since the molded product is bonded to a counterpart material (other molded product formed from a resin) through a welding by a laser, the molded product usually has a shape having at least a contact surface (e.g., a flat surface), for example, a plate-like form. Moreover, the molded product of the present invention is high in transmittance (or penetrability) relative to a laser beam, and the thickness of the laser beam-transmitting site in the molded product (the thickness of the laser beam-transmitting direction) may be selected from a wide range, for example, may be about 0.1 to 5 mm and preferably about 0.1 to 3 mm (for example, about 0.5 to 3 mm).

The light source of the laser beam is not particularly limited to a specific one, and may include, for example, a dye laser, a gas laser, (e.g., an excimer laser, an argon laser, a krypton laser, and a helium-neon laser), a solid-state laser (e.g., a YAG laser), a semiconductor laser (or laser diode), and others. As the laser beam, a pulsed laser is usually employed.

The present invention also discloses a composite molded product (or a composite molded article, a composite molded member, or a composite molded resin member) formed from the laser-transmittable resin molded product. In the composite molded product, a laser-transmittable molded product (or a first molded product) formed from the resin composition and a laser-absorbable resin molded product as a counterpart (a resin molded product located in a laser-absorbing side, a molded product located in a laser-absorbing side, a resin member located in a laser-absorbing side, a member located in a laser-absorbing side, a second molded product, an adherend) are welded and united by a laser welding. Such a composite molded product may be produced by irradiating a laser beam on a contact surface (an interface) of the first molded product and the second molded product. More specifically, the composite molded product may be obtained as a united shaped form by the following manner: the first molded product and the second molded product (particularly, at least joining parts of both products) are brought into contact with each other (particularly, at faces of each joining parts), closely contacted at each joining faces through partly fusing the interface of the articles by a laser irradiation to be bonded or joined each other, and finally united or connected by cooling to be the sole molded form. Use of the molded product of the present invention for such a composite molded product ensures a high bonded strength by a welding and such a bonded strength is as high as the strength of a non-welded molded product.

The resin constituting the laser-absorbable resin molded product is not particularly limited to a specific one, and may include various thermoplastic resins, for example, a styrenic resin, an acrylic resin, a polyester-series resin, a polyamide-series resin, a polycarbonate-series resin, a mixture thereof [or an alloy thereof, e.g., an alloy of a styrenic resin (a rubber-containing styrenic resin such as an ABS resin or an AS resin) and a polyester resin]. Among these resins, the laser-absorbable molded product may comprise the same kind or type of resin as the resin constituting the polybutylene terephthalate-series resin composition (e.g., a polyester-series resin such as a PBT-series resin or a PET-series resin (an aromatic polyester-series resin), a polycarbonate-series resin, and a styrenic resin), or a composition thereof. For example, the second molded product may be formed from the PBT-series resin (or a composition thereof).

The adherend may contain an absorbent for a laser beam or a coloring agent. The coloring agent may be selected depending on the wavelength of the laser beam, and may include an inorganic pigment [for example, a black pigment such as a carbon black (e.g., an acetylene black, a lampblack, a thermal black, a furnace black, a channel black, and Ketjen black), a red pigment (such as an iron oxide red), an orange pigment (such as a molybdate orange), and a white pigment (such as titanium oxide)], an organic pigment (e.g., a yellow pigment, an orange pigment, a red pigment, a blue pigment, and a green pigment), and others. Incidentally, as the laser absorbent, a commercially available product such as 'Clearweld' (manufactured by GENTEX Corporation, a near-infrared light-absorbing material) may be used. These absorbents may be used singly or in combination.

The irradiation (or impingement) of the laser beam is usually conducted in the direction toward the second molded product from the first molded product. The first and the second molded products are welded to each other by generation of heat in the interface of the second molded product containing the absorbent or the coloring agent. Incidentally, if necessary, through the use of a lens system, the contact surface between the first and the second molded products may be welded by focusing the laser beam on the interface.

According to the resin composition of the present invention and the molded product thereof, the combination use of the polybutylene terephthalate-series resin and the fatty acid-series compound (and further the cyclic polyester oligomer) ensures the improvement of the laser transmissivity even when the composition comprises the polybutylene terephthalate-series resin as a base resin. Moreover, the above-mentioned combination realizes a high laser weldability without deterioration in the properties (e.g., mechanical strength and moldability) of the polybutylene terephthalate-series resin.

The composite molded product of the present invention has a high welding strength while retaining the properties of the polybutylene terephthalate-series resin (particularly the PBT-series resin) and can be applied for various applications, for example, an electric or electronic device part, an office automation (OA) device part, a household electrical appliance part, a mechanical device part, an automotive part, and others. In particular, the composite molded product can be preferably utilized for an automotive electrical component or part (e.g., various control units, and an ignition coil part), a motor part, various sensor parts, a connector part, a switch part, a relay part, a coil part, a transformer part, a lamp part, and others.

EXAMPLES

The following examples are intended to describe this invention in further detail and should by no means be interpreted as defining the scope of the invention.

Examples 1 to 10 and Comparative Examples 1 to 2

In Examples and Comparative Examples, the following components were used.

Polybutylene terephthalate-series resin (A);
(A-1) Polybutylene terephthalate (intrinsic viscosity 0.86 dL/g, manufactured by Win Tech Polymer Ltd.)
Fatty acid-series compound (B);
(B-1) Montan wax (manufactured by Toyo-Petrolite Co. Ltd., "LUZAWAX-EP")
(B-2) Calcium stearate (manufactured by NOF Corporation, "Calcium stearate S")
(B-3) Pentaerythritol stearate (manufactured by NOF Corporation, "UNISTAR H476")
(B-4) Sorbitan fatty acid ester (manufactured by Riken Vitamin Co., Ltd., "RIKEMAL B-150")
(b) Non-fatty acid-series compound;
Low-molecular weight polyethylene (manufactured by Sanyo Chemical Industries, Ltd., "SANWAX 165P")
(C) Cyclic polyester oligomer;
Cyclic polybutylene terephthalate oligomer (manufactured by Cyclics Corporation, "CBT" (Cyclic butylene terephthalate), melting point: 140 to 190° C.)

Components were kneaded by using a twin screw extruder (manufactured by Japan Steel Works, Ltd., 30 mmφ) at 250° C. in a proportion shown in Table to prepare pellets. Thus obtained pellets were injection-molded into by an injection molding machine (manufactured by Sumitomo Heavy Industries, Ltd.) under a condition of a cylinder temperature of 260° C. and a mold temperature of 80° C. to produce a plate dumbbell test piece shown in FIG. 1 [a test piece 1 (2 cm in length, 18 cm in width, and 2 in thickness), a wide part 2 (2 cm in length, 3.5 cm in width, and 2 mm in thickness), a narrow part (or gripper) 3 (1 cm in length (central part), 11 cm in width, and 2 mm in thickness)]. The test piece was used to measure a laser beam transmittance and a laser-welding strength as described below. Incidentally, in the Table, the unit of the numerical value is "part(s) by weight" unless otherwise stated.

(Laser Beam Transmittance)

The gauge line part of the above-mentioned dumbbell test piece having a thickness of 2 mm (the center of the test piece 1 or the narrow part 3) was used to measure a transmittance of the test piece at a wavelength of 940 nm by a spectrophotometer using an integrating sphere (manufactured by JASCO Corporation, "V570").

(Laser-Welding Strength)

As a laser-transmittable test piece, the dumbbell test piece having a thickness of 2 mm (the test piece 1) was cut at the center of the narrow part 3 in a thickness direction thereof to give a test piece A (corresponding to the half of the test piece 1). In addition, as an adherend to be welded to the test piece A (a test piece for a laser-absorbing side), an adherend B having the same shape as the test piece A was produced by using a PBT resin (manufactured by Win Tech Polymer Ltd., "DURANEX 2002" (black)).

Figure 2:
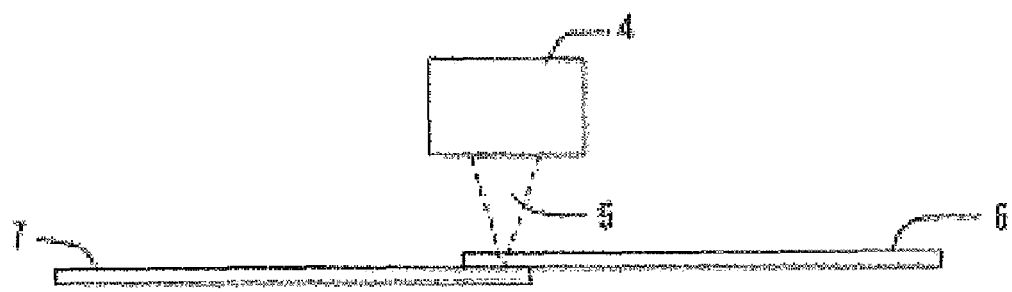
FIG. 2 is a schematic view for illustrating a laser welding in Examples.

As shown in FIG. 2, part of the cut section of the test piece A (6) was superimposed on the cut section of the test piece B (7) to bring the test piece A into contact with the test piece B. With the use of a laser-welding machine, a laser beam (5) from a light source or laser emitter (4) was focused and allowed to transmit the test piece A (6) and irradiated on the test piece B (7) for a laser welding. Incidentally, the laser welding was conducted under the condition of a focal distance of 88 mm (an irradiation diameter of 1.2 mm, an irradiation width of 4 mm, an output power of 34 A, an irradiation speed of 10 mm/s) by using a laser-welding machine (NOVOLAS C Laser Welding manufactured by LEISTER).

Then, by using a tensile tester (manufactured by Orientec Co., Ltd., "RTC-1325PL"), the laser-welded test piece A and test piece B were pulled at 10 mm/minute to determine a laser-welding strength.

The results of Examples and Comparative Examples are shown in the following Table.

absorbable resin molded products are bonded together by laser welding at a laser beam-transmitting site, and wherein the laser-transmittable resin molded product is formed from a resin composition consisting of (A) a polybutylene terephthalate resin, and (B) a fatty acid compound, wherein the fatty acid compound (B) comprises at least one member selected from the group consisting of a $C_{12-36}$ fatty acid ester with a $C_{3-12}$ aliphatic polyol having 3 or more hydroxyl groups and a metal salt of a $C_{12-36}$ fatty acid, the proportion of the fatty acid compound (B) is 0.04 to 0.4 part by weight relative to 100 parts by weight of the polybutylene terephthalate resin (A), and the laser beam-transmitting site in the molded product has a thickness of 0.1 to 5 mm.

2. A composite molded product according to claim 1, wherein the $C_{3-12}$ aliphatic polyol is sorbitan.

3. A composite molded product comprising a laser-transmittable resin molded product and a laser-absorbable resin molded product, wherein the laser-transmittable and laser-absorbable resin molded products are bonded together by laser welding at a laser beam-transmitting site, and wherein the laser-transmittable resin molded product is formed from a resin composition consisting of (A) a polybutylene terephthalate resin, (B) a fatty acid compound and (C) a cyclic polyester oligomer, the fatty acid compound (B) comprises at least one member selected from the group consisting of a $C_{12-36}$ fatty acid ester with a $C_{3-12}$ aliphatic polyol having 3 or more hydroxyl groups and a metal salt of a $C_{12-36}$ fatty acid, the proportion of the fatty acid compound (B) is 0.04 to 0.4 part by weight relative to 100 parts by weight of the polybutylene terephthalate resin (A), the proportion of the cyclic polyester oligomer (C) is 0.01 to 20 parts by weight relative to 100 parts by weight of the polybutylene terephthalate resin (A), and the laser beam-transmitting site in the molded product has a thickness of 0.1 to 5 mM.

4. A composite molded product according to claim 3, wherein the cyclic polyester oligomer (C) comprises a cyclic polyalkylene terephthalate oligomer.

TABLE

| Components | Examples | | | | | | | | | | Comparative Examples | |
|---|---|---|---|---|---|---|---|---|---|---|---|---|
| | 1 | 2 | 3 | 4 | 5 | 6 | 7 | 8 | 9 | 10 | 1 | 2 |
| A | 100 | 100 | 100 | 100 | 100 | 100 | 100 | 100 | 100 | 100 | 100 | 100 |
| B-1 | 0.1 | 0.1 | 0.3 | 0.3 | — | — | — | — | — | — | — | — |
| B-2 | — | — | — | — | 0.3 | 0.3 | — | — | — | — | — | — |
| B-3 | — | — | — | — | — | — | 0.3 | 0.3 | — | — | — | — |
| B-4 | — | — | — | — | — | — | — | — | 0.3 | 0.3 | — | — |
| b | — | — | — | — | — | — | — | — | — | — | — | 0.3 |
| C | — | 3 | — | 3 | — | 3 | — | 3 | — | 3 | — | — |
| Transmittance (%) | 24.2 | 24.8 | 24.4 | 25.9 | 24.7 | 26 | 25.2 | 26.4 | 25.3 | 26.3 | 22.5 | 22.9 |
| Welding strength (N) | 166 | 175 | 163 | 198 | 178 | 195 | 196 | 202 | 191 | 210 | 157 | 136 |

What is claimed is:

1. A composite molded product comprising a laser-transmittable resin molded product and a laser-absorbable resin molded product, wherein the laser-transmittable and laser- 5. A composite molded product according to claim 3, wherein the average degree of polymerization of the cyclic polyester oligomer (C) is 2 to 30.

* * * * *